(12) United States Patent
Lee et al.

(10) Patent No.: US 7,422,778 B2
(45) Date of Patent: Sep. 9, 2008

(54) PHOTOREACTIVE COMPOUND, LIQUID CRYSTAL ALIGNMENT LAYER USING THE COMPOUND, METHOD OF MANUFACTURING THE ALIGNMENT LAYER, AND LIQUID CRYSTAL DISPLAY DEVICE CONTAINING THE ALIGNMENT LAYER

(75) Inventors: Byung Hyun Lee, Daejeon (KR); Min Young Lim, Seongnam (KR); Kyungjun Kim, Daejeon (KR); Sung Ho Chun, Daejeon (KR); Sung Joon Oh, Daejeon (KR); Keon Woo Lee, Daejeon (KR); Heon Kim, Yeosu (KR); Hye Won Jeong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 258 days.

(21) Appl. No.: 11/292,089

(22) Filed: Dec. 2, 2005

(65) Prior Publication Data

US 2006/0121213 A1 Jun. 8, 2006

(30) Foreign Application Priority Data

Dec. 3, 2004 (KR) ........................ 10-2004-0101102

(51) Int. Cl.
*C09K 19/00* (2006.01)
*G03C 1/76* (2006.01)
*C07C 13/567* (2006.01)
*C08F 20/10* (2006.01)
*G02F 1/1337* (2006.01)

(52) U.S. Cl. ........................ 428/1.2; 430/270.1; 430/321; 585/26; 526/321; 349/123

(58) Field of Classification Search ........................ 428/1.2; 526/284, 329, 321; 430/270.1, 321; 585/26; 349/123
See application file for complete search history.

(56) References Cited

U.S. PATENT DOCUMENTS 4,618,566 A 10/1986 Guillet et al.

(Continued)

FOREIGN PATENT DOCUMENTS

EP 1 215 192 A2 6/2002

(Continued)

OTHER PUBLICATIONS

Schadt, Martin, et al., Surface-Induced Parallel Alignment of Liquid Crystals by Linearly Polymerized Photopolymers, Jpn. J. Appl. Phys. vol. 31 (1992) pp. 2155-2164.

*Primary Examiner*—Shean C Wu
(74) *Attorney, Agent, or Firm*—McKenna, Long & Aldridge LLP

(57) ABSTRACT

Provided are a photoreactive compound represented by formula (1), a liquid crystal alignment layer using the compound, a method of manufacturing the alignment layer, and a liquid crystal display device including the alignment layer:

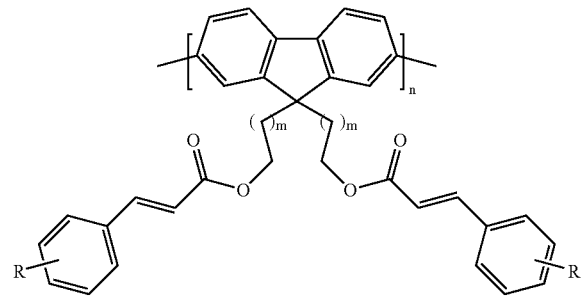

(1)

where n is an integer of 20-1000;
m is an integer of 1-5; and
R is a hydrogen atom, CN, a C1-C5 alkyloxy group, a halogen atom, or a maleimide group.

9 Claims, 2 Drawing Sheets

U.S. PATENT DOCUMENTS

| | | | |
|---|---|---|---|
| 5,464,669 | A | 11/1995 | Kang et al. |
| 5,998,101 | A | 12/1999 | Park et al. |
| 6,218,501 | B1 * | 4/2001 | Choi et al. .................. 528/170 |
| 6,830,831 | B2 * | 12/2004 | O'Neill et al. .............. 428/690 |
| 7,303,855 | B2 * | 12/2007 | Hatakeyama et al. .... 430/270.1 |
| 2005/0239636 | A1 * | 10/2005 | Gao et al. ................... 502/103 |

FOREIGN PATENT DOCUMENTS

| | | |
|---|---|---|
| JP | 06-095066 | 4/1994 |
| JP | 1999-181127 | 7/1999 |
| JP | 2002-179611 | 6/2002 |
| JP | 2004-070347 | 3/2004 |
| KR | P1998-0012133 | 4/1998 |
| KR | 1998-078124 | 11/1998 |
| KR | 10-2004-0081765 | 9/2004 |
| WO | WO 03/068723 A1 | 8/2003 |
| WO | WO 03/091767 A1 | 11/2003 |

OTHER PUBLICATIONS

Dyaduysha, Andrey, et al., Peculiarity of an Oblique Liquid Crystal Alignment Induced by a Photosensitive Orientant, Jpn. J. Appl. Physics. vol. 34 (1995) pp. L 1000-L 1002.

Dessislava Sainova, et al; *Photoaddressable Alignment Layers for Fluorescent Polymers in Polarized Electroluminescence Devices*; Advanced Functional Materials; Jan. 1, 2002; pp. 49-57.

X. H. Yang, et al; *Efficient Polarized Light-Emitting Diodes Ulitlizing Ultrathin Photoaddressable Alignment Layers*: Applied Physics Letters; vol. 81, No. 13; Sep. 23, 2002; pp. 2319-2321.

* cited by examiner

PHOTOREACTIVE COMPOUND, LIQUID CRYSTAL ALIGNMENT LAYER USING THE COMPOUND, METHOD OF MANUFACTURING THE ALIGNMENT LAYER, AND LIQUID CRYSTAL DISPLAY DEVICE CONTAINING THE ALIGNMENT LAYER

CROSS-REFERENCE TO RELATED PATENT APPLICATION

This application claims the benefit of Korean Patent Application No. 10-2004-0101102, filed on Dec. 3, 2004, in the Korean Intellectual Property Office, the disclosure of which is incorporated herein in its entirety by reference.

BACKGROUND OF THE INVENTION

1. Field of the Invention

The present invention relates to a liquid crystal display device, and more particularly, to a photoreactive compound which can be aligned by photoreaction and includes fluorene in its backbone to have superior alignment controlling ability, a liquid crystal alignment layer using the compound, a method of manufacturing the alignment layer, and a liquid crystal display device including the alignment layer.

2. Description of the Related Art

Recently, liquid crystal displays (LCDs) have come to prominence as replacements for cathode ray tubes due to their advantages of light weight and low power consumption. In particular, a thin film transistor liquid crystal display (TFT-LCD) driven by a TFT has high response speed of liquid crystal since individual pixels are independently driven, which makes it possible to realize high quality moving images. Thus, TFT-LCDs are widely used in notebook computers, wall tapestry type TVs, etc.

When a general color TFT-LCD is manufactured, a TFT driving device and an ITO (indium titanium oxide) transparent electrode are deposited on a glass substrate, and then an alignment layer is deposited thereon to form a lower substrate of a cell. A space for injecting a liquid crystal material is formed between a pair of upper and lower substrates using a sealant. A polarization film is coated on an outer surface of the glass substrate. Finally, a liquid crystal material is injected into the space between the pair of substrates and cured to complete a LCD cell.

In order to use liquid crystal as an optical switch in a TFT-LCD, the liquid crystal should be initially aligned in a certain direction on a TFT layer which is the innermost layer of a display cell. To this end, an alignment layer is required.

It is known that an alignment layer is manufactured by rubbing a polymer layer, such as a polyimide resin layer, formed on a substrate with a cloth etc. in one direction or by obliquely depositing silicon dioxide ($SiO_2$) on a substrate. When an alignment layer is manufactured using the rubbing process, contamination may be caused due to contact with impurities during rubbing, a product yield may be reduced due to occurrence of static electricity, and contrast may be reduced. When oblique deposition is used, the production costs increase and it is difficult to form a large area, and thus it is not suitable for a large LCD.

To solve the above problems, an alignment method comprising a non-rubbing process using a photopolymerizible alignment material was developed in which photopolymerization is caused by light irradiation to induce an arrangement of polymers, thereby aligning liquid crystal. An example of such a non-rubbing process is photo-alignment by photopolymerization, which is reported by M. Schadt et al. (Jpn. J. Appl. Phys., Vol 31, 1992, 2155), Dae S. Kang et al. (U.S. Pat. No. 5,464,669), and Yuriy Reznikov (Jpn. J. Appl. Phys. Vol. 34, 1995, L1000). Photo-alignment refers to a mechanism in which a backbone of a polymer is arranged in a certain direction, thereby aligning liquid crystal, when a photosensitive group bonded to the polymer undergoes a photoreaction due to pre-polarized ultra violet rays.

Japanese Patent Laid-Open Publication No. Hei 11-181127 (6 Jul. 1999) discloses a method of manufacturing a polymeric alignment layer, in which a backbone is acrylate, methacrylate, etc. and a side chain includes a photosensitive group, such as a cinnamic acid group, and an alignment layer manufactured by the method. However, such an alignment layer has lower anchoring energy than an alignment layer manufactured using a rubbing process, and a twist angle is about 88°, resulting in low contrast, which makes it difficult to obtain high-definition picture quality.

Further, Korean Patent Laid-Open Publication No.1998-78124 (16 Nov. 1998) discloses a cinnamate-based photosensitive polymer. Likewise, contrast ratio is still low.

SUMMARY OF THE INVENTION

The present invention provides a photoreactive compound capable of providing a liquid crystal alignment layer having a twist angle of 89° or greater and high anchoring energy.

The present invention also provides a liquid crystal alignment layer manufactured using the photoreactive compound.

The present invention also provides a method of manufacturing the liquid crystal alignment layer.

The present invention also provides a liquid crystal display device including the liquid crystal alignment layer.

According to an aspect of the present invention, there is provided a photoreactive compound represented by formula (1):

(1)

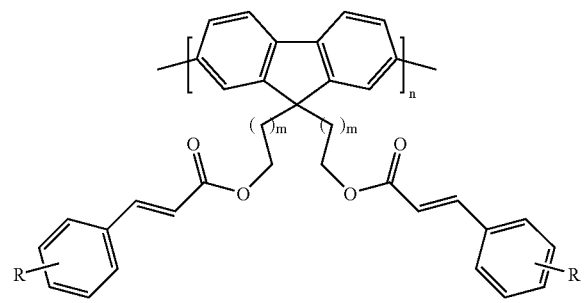

where n is an integer of 20-1000; m is an integer of 1-5; and R is a hydrogen atom, CN, a C1-C5 alkyloxy group, a halogen atom, or a maleimide group.

According to another aspect of the present invention, there is provided a liquid crystal alignment layer manufactured using the compound represented by formula (1).

According to another aspect of the present invention, there is provided a method of manufacturing a liquid crystal alignment layer, comprising: applying the compound represented by formula (1) to a substrate; forming an alignment layer by irradiating polarized UV rays onto the compound to dimerize the compound; and annealing the alignment layer at a glass transition temperature or lower of the alignment layer.

According to another aspect of the present invention, there is provided a liquid crystal display device including the liquid crystal alignment layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
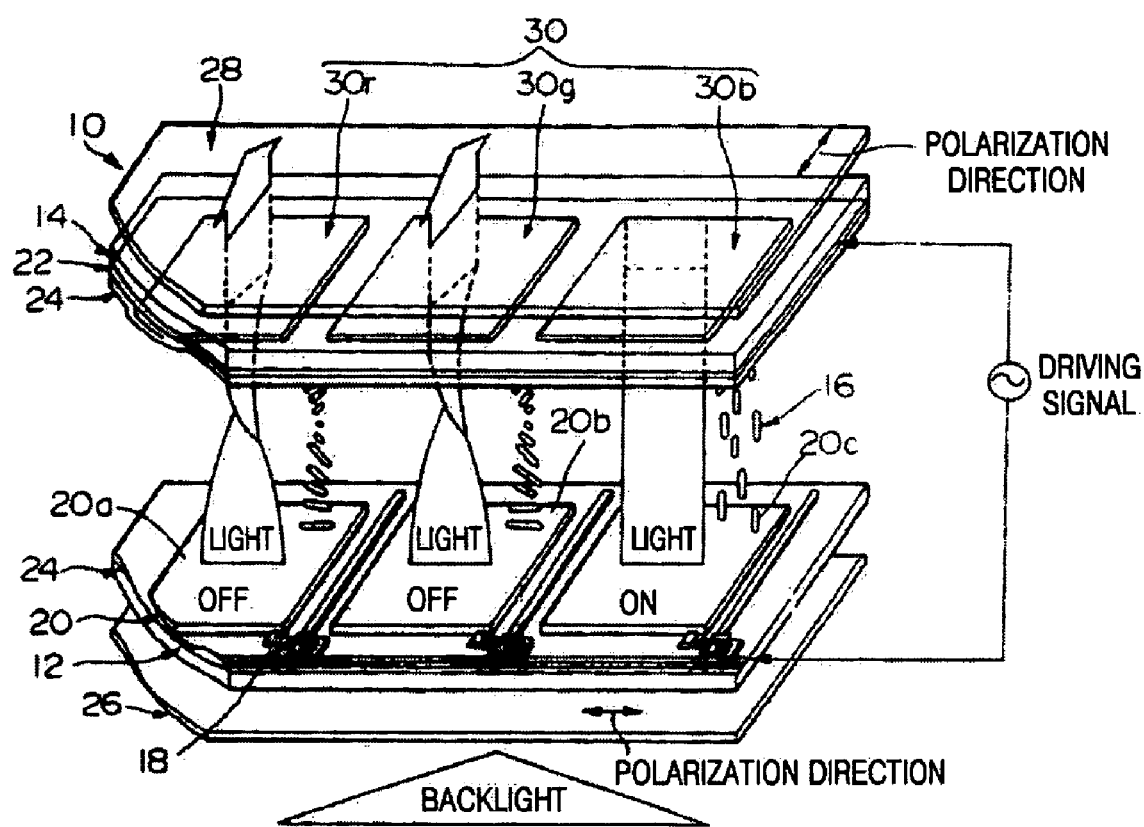
FIG. 1 is a schematic diagram of a liquid crystal display device according to an embodiment of the present invention.

Hereinafter, the present invention will be described in detail by explaining embodiments of the invention with reference to the attached drawings.

A photoreactive compound according to an embodiment of the present invention includes fluorene in its backbone, and thus actively interacts with liquid crystal and has a strong linear molecular structure. Furthermore, an alignment layer is manufactured and cinnamate groups are dimerized by irradiation of polarized UV rays so that fluorene molecules and its photoreacted cinnamate side chains are first aligned, and then the alignment layer is annealed at a temperature lower than the glass transition temperature of the alignment layer, which enables a fluorene compound having a cinnamate group, which is not photoreacted, to interact with the first aligned fluorene compound by photoreaction, thereby causing second alignment of molecules. Thus, the alignment layer according to an embodiment of the present invention has improved alignment due to first molecular alignment and second molecular alignment, and thereby, can have an increased anchoring energy.

The anchoring energy refers to an anisotropic interaction force which an alignment layer applies to liquid crystal, which can be determined by a twist angle. The twist angle refers to an angle generated by a director of liquid crystal molecules on a surface of an aligned liquid crystal cell and a director of liquid crystal molecules on the opposing surface of the aligned liquid crystal cell. A liquid crystal alignment layer manufactured using a rubbing process has a twist angle of 90°, whereas a conventional photoreactive liquid crystal alignment layer has a twist angle up to 88° due to low anchoring energy. However, the twist angle of the liquid crystal alignment layer according to an embodiment of the present invention is 88-90°, which is at least 1.5° higher than the twist angle of a conventional photoreactive liquid crystal alignment layer. Due to an increased twist angle, contrast ratio is increased and high quality images can be obtained.

The photoreactive compound according to an embodiment of the present invention is a compound represented by formula (1):

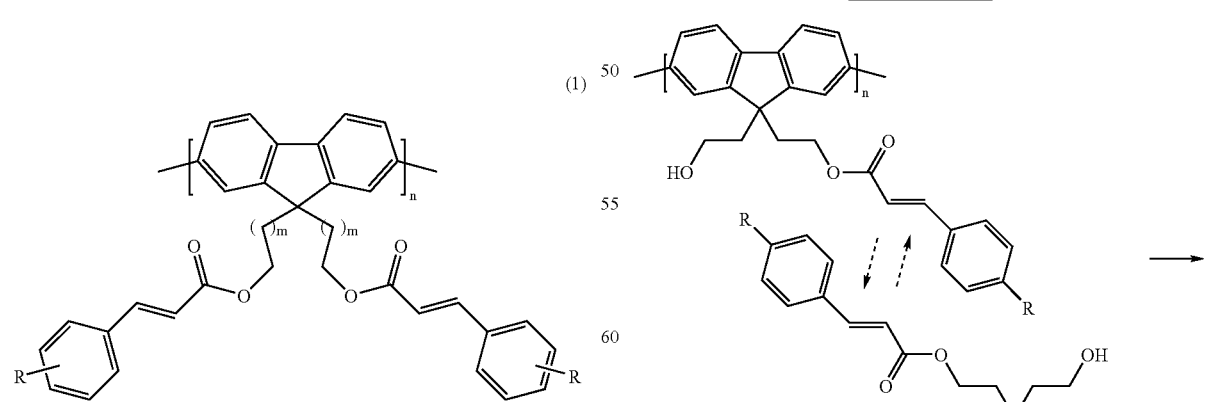

(1)

where n is an integer of 20-1000; m is an integer of 1-5; and R is a hydrogen atom, CN, a C1-C5 alkyloxy group, a halogen atom, or a maleimide group.

When n is greater than 1000, mobility of backbone is reduced, and thus, second molecular alignment does not effectively occur during an annealing process.

On the other hand, when m is greater than 5, an alkyl chain is long enough to reduce reaction density.

When the R is CN, a C1-C5 alkyloxy group, a halogen atom, or a maleimide group, the pretilt angle of liquid crystal molecules can be improved.

The photoreactive compound according to an embodiment of the present invention may be a compound represented by formula (2):

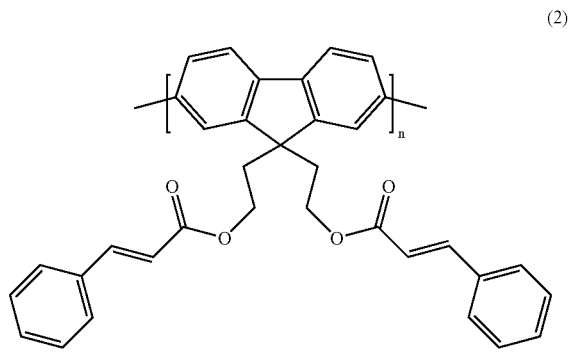

(2)

where n is an integer of 20-1000.

When a liquid crystal alignment layer is formed using the compound represented by formula (2), irradiation of polarized UV rays induces dimerization as in the following reaction scheme 1 to allow molecules to be first aligned:

Reaction Scheme 1

-continued

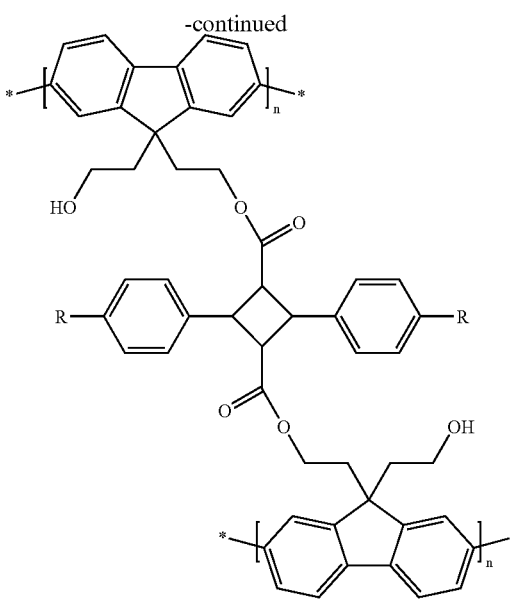

The photoreactive compound according to an embodiment of the present invention may be a compound represented by formula (3):

(3)

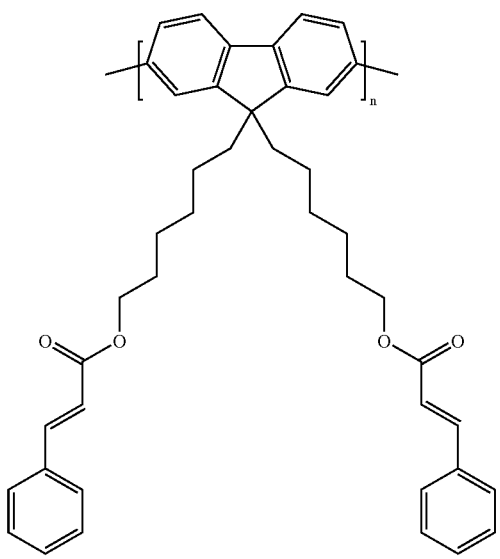

where n is an integer of 20-1000.

As the length of an alkyl group in the compound increases, a liquid crystal phase is realized and a photoreactive group is provided with flexibility. However, when the number of carbon atoms of the alkyl group is greater than 5, liquid crystallinity is undesirably reduced.

The alignment layer for a liquid crystal display device according to an embodiment of the present invention can be manufactured by applying a photoreactive compound solution to a substrate having a transparent electrode, removing a solvent to form an alignment layer, irradiating UV rays, which are polarized in a certain direction, onto the alignment layer to provide an anisotropic surface of the alignment layer, and annealing the alignment layer at a temperature lower than the glass transition temperature of the alignment layer to secondarily align the alignment layer.

A method of manufacturing the alignment layer according to an embodiment of the present invention includes applying the photoreactive compound represented by formula (1) to a substrate; forming an alignment layer by irradiating polarized UV rays onto the compound to dimerize the compound; and annealing the alignment layer at a glass transition temperature or slightly higher of the alignment layer.

A useful organic solvent for dissolving the compound according to an embodiment of the present invention is not particularly restricted, but may be chlorobenzene, N-methylpyrrolidone, dimethylsulfoxide, dimethylformamide, toluene, chloroform, γ-butyrolactone, tetrahydrofurane, etc. The photoreactive compound solution can be applied to a substrate using any coating method, for example, a spin coating or printing method. The photoreactive compound is applied to an ITO glass substrate to form an alignment layer with a thickness of 500-1000 Å.

The alignment layer applied to the ITO glass substrate is dried at about 140° C. for 30 minutes and, if necessary, may be heated to a temperature higher than 140° C. for 1 hour or more to remove a solvent.

Next, polarized UV rays, which are pre-polarized with a polarizer using a UV lamp with an intensity of about 1 KW, are irradiated onto the alignment layer to dimerize cinnamate groups, thereby causing first molecular alignment. Then, annealing is carried out at a temperature lower than the glass transition temperature of the alignment layer to cause second molecular alignment.

When the photoreactive compound is the compound represented by formula (2) in which n is an integer of 20-1000, a proper annealing temperature is 120-150° C. and when the photoreactive compound is the compound represented by formula (3) in which n is an integer of 20-1000, a proper annealing temperature is 120-150° C.

The annealing may be carried out for 0.5-100 minutes. When the annealing time is less than 0.5 minute, the second molecular alignment effect is insufficient, and when the annealing time is greater than 100 minutes, the second molecular alignment effect is rarely obtained.

FIG. 1 illustrates a liquid crystal display device according to an embodiment of the present invention. Referring to FIG. 1, a color liquid crystal display device 10 includes: a pair of substrates 12 and 14 facing each other; liquid crystal 16 filled between the pair of substrates 12 and 14; a liquid crystal driving device 18 on the substrate 12; a transparent electrode 20 (pixel electrodes 20a, 20b, and 20c), which is connected to the liquid crystal driving device 18; an opposing electrode 22, which faces the transparent electrode 20 and is formed on the substrate 14; an alignment layer 24 supporting the liquid crystal 16, polarization filters (a lower polarization filter 26 and an upper polarization filter 28) formed on each of the substrates 12 and 14; and color filters 30r, 30g, and 30b, which are formed on the substrate 14.

The substrates 12 and 14 may be any substrate which is used in a general liquid crystal display device, and various materials such as ceramic etc. as well as glass can be used. Also, the shape of the substrate corresponds to that of a finished liquid crystal display device and a substrate having a certain shape, such as a planar rectangular substrate, can be used.

The liquid crystal 16 changes molecular alignment state when a voltage is applied thereto. For example, in a twisted-nematic (TN) mode liquid crystal 16 illustrated in FIG. 1, a row of molecules is 90° twisted when a voltage is not applied, but is aligned vertically when a voltage is applied. Although it is not illustrated in FIG. 1, spacers composed of particulates are interposed between both alignment layers 24 and 24 and maintains a distance between LC cells in a predetermined length.

A TFT is used as the liquid crystal driving device 18 and controls the voltage applied to the liquid crystal 16 by a driving signal.

The transparent electrode 20 facing a counter electrode 22, which is formed on the substrate 14, applies a voltage from the liquid crystal driving device 18 to the liquid crystal 16 and generally is an ITO layer etc. Although the liquid crystal driving device 18 and transparent electrodes 20a, 20b, and 20c are installed with respect to each pixel, the counter electrode 22 is generally a common pixel electrode.

The polarization filters 26 and 28 are films which emit linearly polarized light and are placed on the substrates 12 and 14 of the liquid crystal display device 10 such that an angle generated by their polarization directions is 90°.

The color filter 30 is used in a color liquid crystal display device and is generally composed of a set of red, green, and blue color filters with respect to each pixel. In a color liquid crystal display device, these three colors are combined to display various colors.

The present invention will now be described in greater detail with reference to the following examples. The following examples are for illustrative purposes only and are not intended to limit the scope of the invention.

EXAMPLE 1

1-(1) Synthesis of Monomer 5 g of 2-(2-bromoethoxy)tetrahydro-2H-pyran and 3 g of 2,7-dibromofluorene were reacted in an equivalent ratio of 1:2.4 in a 50 wt % aqueous solution of DMSO/NaOH at room temperature for 24 hours. At this time, benzyltriethylammonium chloride was used as a phase transfer catalyst. After the reaction was completed, the resultant was extracted with methylene chloride to remove the solvent. The residue was purified with a $SiO_2$ column chromatography (EA:n-Hexane) to obtain 4 g of 2-[2-(2,7-dibromofluoren-9,9'-yl)ethoxy]perhydro-2H-pyran (yield: 50%).

NMR data: 1.25-1.46 (m, 12H), 2.35-2.37 (t, 4H), 2.70-2.72 (m, 2H), 3.13-3.15 (m, 2H), 3.24-3.26 (m, 2H), 3.45-3.47 (m, 2H), 4.10-4.27 (t, 2H), 7.44-7.62 (m, 6H).

1-(2) Synthesis of Polymer

Under an Ar atmosphere, 1.8 g of the monomer prepared above was dissolved in 10 ml of purified toluene. 2.2 equivalent of $Ni(COD)_2$, 2,2'-bipyridyl, and 1,5-COD were dissolved in purified DMF/toluene (volume ratio=1:2) and was stirred at 80° C. for 30 minutes, and then the monomer solution was added dropwise thereto. The mixed solution was further reacted at 80° C. for 3 days and cooled to room temperature. Then, the solution was added to a HCl:acetone:MeOH (volume ratio=1:1:2) solution to obtain precipitates. The obtained precipitates were reprecipitated with methyl alcohol to obtain 1.0 g of the desired polymer (yield: 55%).

A weight average molecular weight of the polymer was about 45,000.

1-(3) Synthesis of Photoreactive Compound 0.7 g of the polymer obtained above was dissolved in a mixed solution of 0.5 ml of pyridine as base and 30 ml of N-methylpyrrolidone. 2.4 equivalent of Cinnamoyl chloride was added dropwise to the solution and was reacted at 50° C. After reaction for 8 hours, the resulting solution was precipitated with methyl alcohol to obtain 0.5 g of a photoreactive compound (yield: 71%).

NMR data: 2.15-2.17 (t, 4H), 3.80-3.85 (m, 4H), 6.14-6.18 (m, 1H), 7.27-7.86 (m, 18H).

EXAMPLE 2

2-(1) Synthesis of 6-bromohexyl cinnamate 7 g of 6-bromohexanol was dissolved in a mixed solution of 5 ml of triethylamine as base and 50 ml of THF, and then, cinnamoyl chloride was added dropwise thereto at 0° C. The resultant was filtered to remove the solvent and the residue was purified with a $SiO_2$ column chromatography (EA:n-Hexane=1:5) to obtain 8 g of 6-bromohexyl cinnamate (yield: 53%).

NMR data: 1.44-1.91 (m, 8H), 3.41-3.44 (t, 2H), 4.20-4.23 (t, 2H), 6.42-6.47 (m, 1H), 7.37-7.55 (m, 5H), 7.67-7.72 (m, 1H).

2-(2) Synthesis of Monomer 8 g of 6-bromohexyl cinnamate prepared above and 2,7-dibromofluorene were reacted in an equivalent ratio of 1:2.4 in a 50 wt % aqueous solution of DMSO/NaOH at room temperature for 24 hours. At this time, benzyltriethylammonium chloride was used as a phase transfer catalyst. After the reaction was completed, the resultant was extracted with methylene chloride to remove the solvent. The residue was purified with a $SiO_2$ column chromatography (EA:n-Hexane) to obtain 2 g of 9,9'-bis(cinnamoylhexyl)-2,7-dibromofluorene (yield: 20%).

NMR data: 1.28-1.68 (m, 16H), 1.81-1.99 (m, 4H), 3.45-3.68 (m, 4H), 6.43-6.48 (m, 1H), 7.10-7.73 (m, 18H).

2-(3) Synthesis of Photoreactive Compound

Under an Ar atmosphere, 2 g of the monomer prepared above was dissolved in 11 ml of purified toluene. 2.2 equivalent of $Ni(COD)_2$, 2,2'-bipyridyl, and 1,5-COD were dissolved in purified DMF/toluene (volume ratio=1:2) and was stirred at 80° C. for 30 minutes, and then the monomer solution was added dropwise thereto. The mixed solution was further reacted at 80° C. for 3 days and cooled to room temperature. Then, the solution was added to a HCl:acetone:MeOH (volume ratio=1:1:2) solution to obtain precipitates. The obtained precipitates were reprecipitated with methyl alcohol to obtain 0.8 g of a photoreactive compound (yield: 40%).

NMR data: 1.10-1.60 (br, 16H), 2.20-2.24 (t, 4H), 3.70-3.98 (br, 4H), 6.50-6.70 (m, 1H), 7.27-7.86 (br, 18H).

EXAMPLE 3

3-(1) Synthesis of Monomer 5 g of 2-(2-bromoethoxy)tetrahydro-2H-pyran and 2,7-dibromofluorene were reacted in an equivalent ratio of 1:2.4 in a 50 wt % aqueous solution of DMSO/NaOH at room temperature for 24 hours. At this time, benzyltriethylammonium chloride was used as a phase transfer catalyst. After the reaction was completed, the resultant was extracted with methylene chloride to remove the solvent. The residue was purified with a $SiO_2$ column chromatography (EA:n-Hexane) to obtain 4 g of 2-[2-(2,7-dibromofluoren-9,9'-yl)ethoxy]perhydro-2H-pyran (yield: 50%).

3-(2) Synthesis of Polymer

Under an Ar atmosphere, 4 g of the monomer prepared above was dissolved in 25 ml of purified toluene. 2.2 equivalent of $Ni(COD)_2$, 2,2'-bipyridyl, and 1,5-COD were dissolved in purified DMF/toluene (volume ratio=1:2) and was stirred at 80° C. for 30 minutes, and then the monomer solution was added dropwise thereto. The mixed solution was further reacted at 80° C. for 3 days and cooled to room temperature. Then, the solution was added to a HCl:acetone:MeOH (volume ratio=1:1:2) solution to obtain precipitates.

The obtained precipitates were reprecipitated with methyl alcohol to obtain 2 g of the desired polymer (yield: 50%).

3-(3) Synthesis of Photoreactive Compound 2 g of the polymer obtained above was dissolved in a mixed solution of 1.5 ml of pyridine as base and 35 ml of N-methylpyrrolidone. 2.4 equivalent of 3-fluoro cinnamoyl chloride was added dropwise to the solution and was reacted at 50° C. After reaction for 8 hours, the resulting solution was precipitated with methyl alcohol to obtain 1.2 g of a photoreactive compound (yield: 50%).

EXAMPLES 4-6

Manufacture of Alignment Layer

The photoreactive compounds prepared in Examples 1-3 were respectively dissolved in a mixed solvent of dichlorobenzene, γ-butyrolactone, and bromofluorobenzene to a concentration of 2 wt %. The resulting solutions were spin coated on an ITO substrate to form a layer. The layer was heated in an oven at 140° C. for 30 minutes to remove the solvent in the layer. The layer coated on the ITO substrate was irradiated with polarized UV rays which were emitted from glan-laser polarizer (manufactured by Meles-Griot) using a 750 W high pressure mercury lamp as a light source. Irradiation was carried out for 1 minute and annealing was carried out at 67° C. for 1 hour to improve a degree of molecular alignment.

EXPERIMENTAL EXAMPLE 1

Effects of Annealing Time on Alignment

Figure 2:
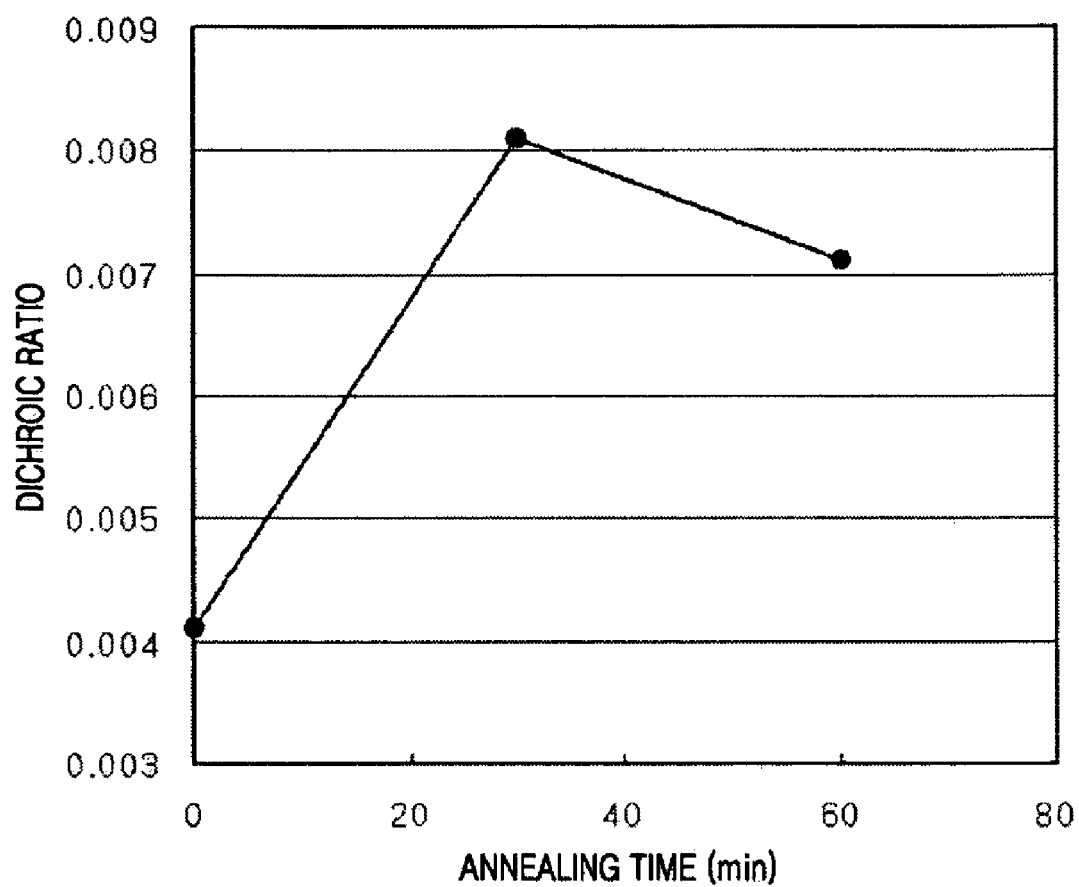
FIG. 2 is a graph illustrating the variation in alignment with respect to the annealing time of a liquid crystal alignment layer manufactured in Example 4.

The liquid crystal alignment layer manufactured in Example 4 (using the photoreactive compound of Example 1) was subjected to a UV/Vis spectroscopy polarization experiment at intervals of 30 minutes while annealing on a hot plate to 67° C. The results are illustrated in FIG. 2. The initial dichroic ratio obtained using only UV irradiation is about 0.004, whereas the dichroic ratio obtained by annealing for 30 minutes is greater than 0.008, which indicates a 2 times increased alignment. This is because both the first alignment of an oligomeric fluorene backbone due to [2+2] cycloaddition of cinnamate side chain and the second alignment of fluorene due to annealing were achieved, which can be identified through a peak of fluorene at 397 nm.

That is, when a UV/Vis spectroscopy polarization experiment is performed on fluorene cinnamate, two peaks can be obtained at 280 nm and 397 nm. Among these, the peak at 280 nm is assigned to a cinnamate side chain and the peak at 397 nm is assigned to a fluorene backbone. With respect to a light source of polarized UV/Vis spectroscopy, when the polarization direction of a light source for UV irradiation for initial alignment is changed, i.e., vertical or horizontal, the intensity of peaks on the spectrum is changed, which is attributed to anisotropic alignment of a molecular chain. Thus, a degree of arrangement of molecular alignment is presumed by a difference between peak intensity in a vertical direction and peak intensity in a horizontal direction. As the difference increases, the degree of arrangement of molecular alignment increases. The aim of this test is to improve alignment of a fluorene backbone having a low molecular weight and liquid crystal phase by [2+2] cycloaddition of a cinnamate side chain to ultimately improve performance as an alignment layer. Further alignment of fluorene backbone can be identified by anisotropy of the peak at 397 nm. Thus, it can be seen that an increase in alignment effect of 1.5 times or more can be obtained compared to when polymers of an alignment layer are aligned by only photoreaction.

The liquid crystal alignment layer according to an embodiment of the present invention actively interacts with liquid crystal due to fluorene in its backbone. Furthermore, since fluorene is aligned due to dimerization of cinnamate by irradiation of UV rays, and then is further aligned by annealing, alignment of the liquid crystal alignment layer is improved. Moreover, anchoring energy is increased to obtain a twist angle of 89.5-90°, and thus a contrast ratio can be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A photoreactive compound represented by formula (1):

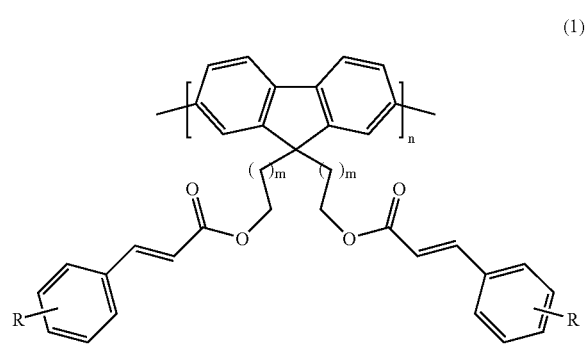

(1)

where n is an integer of 20-1000;

m is an integer of 1-5; and

R is a hydrogen atom, CN, a C1-C5 alkyloxy group, a halogen atom, or a maleimide group.

2. The photoreactive compound of claim 1, wherein the compound represented by formula (1) is a compound represented by formula (2):

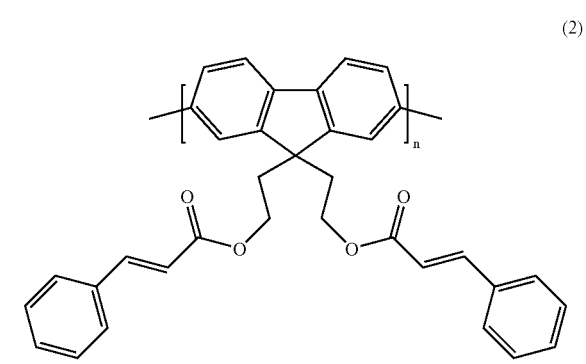

(2)

where n is an integer of 20-1000.

3. The photoreactive compound of claim 1, wherein the compound represented by formula (1) is a compound represented by formula (3):

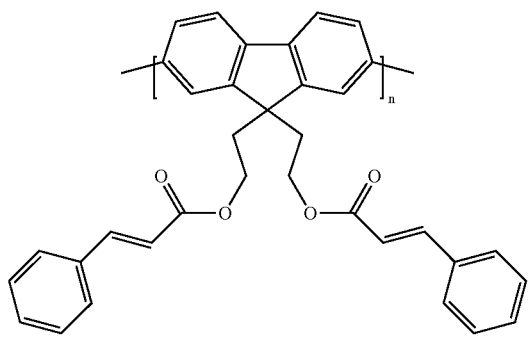

where n is an integer of 20-1000, and

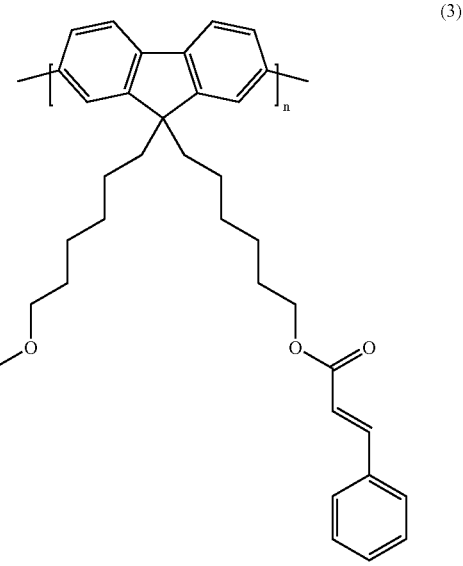

where n is an integer of 20-1000.

6. The method of claim 5, wherein, when the compound is the compound represented by formula (2) in which n is an integer of 20-1000, the annealing is carried out at 120-150° C.

7. The method of claim 5, wherein, when the compound is the compound represented by formula (3) in which n is an integer of 20-1000, the annealing is carried out at 120-150° C.

8. The method of claim 5, wherein the annealing is carried out for 0.5-100 minutes.

9. A liquid crystal display device comprising the liquid crystal alignment layer of claim 4.

* * * * *

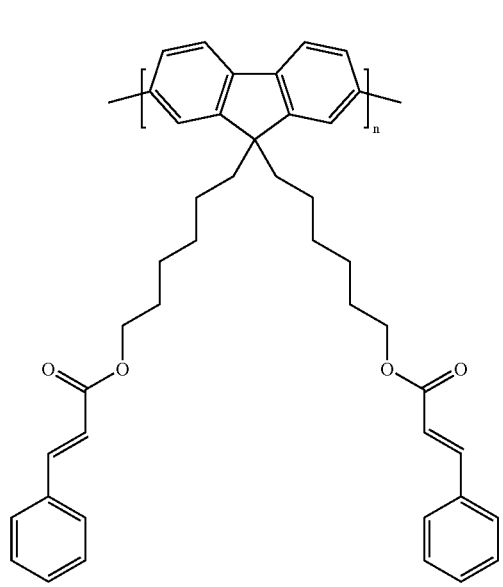

where n is an integer of 20-1000.

4. A liquid crystal alignment layer manufactured using the compound of any one of claims 1-3.

5. A method of manufacturing a liquid crystal alignment layer, comprising:
   applying the compound represented by any one of formulae 1-3 to a substrate;
   forming an alignment layer by irradiating polarized UV rays onto the compound to dimerize the compound; and
   annealing the alignment layer at a glass transition temperature or lower of the alignment layer:

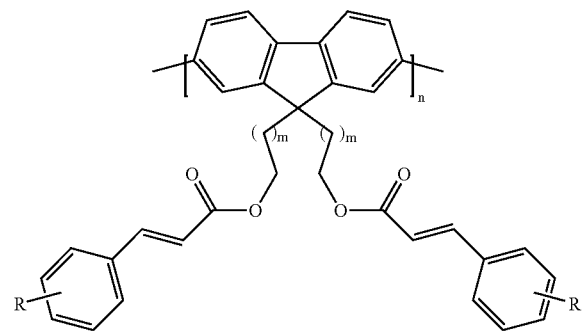

where n is an integer of 20-1000.
m is an integer of 1-5; and
R is a hydrogen atom, CN, a C1-C5 alkyloxy group, a halogen atom, or a maleimide group,